United States Patent [19]

Berry et al.

[11] Patent Number: 5,900,879
[45] Date of Patent: May 4, 1999

[54] THREE-DIMENSIONAL WORKSPACE INTERACTIVE DISPLAY HAVING BROWSING VIEWPOINTS FOR NAVIGATION AND WORK VIEWPOINTS FOR USER-OBJECT INTERACTIVE NON-NAVIGATIONAL WORK FUNCTIONS WITH AUTOMATIC SWITCHING TO BROWSING VIEWPOINTS UPON COMPLETION OF WORK FUNCTIONS

[75] Inventors: Richard Edmond Berry, Georgetown; John Martin Mullaly, Austin, both of Tex.

[73] Assignee: International Business Machines Corporation, Armonk, N.Y.

[21] Appl. No.: 08/845,876

[22] Filed: Apr. 28, 1997

[51] Int. Cl.⁶ .................................................. G06F 3/14
[52] U.S. Cl. ............................................................ 345/419
[58] Field of Search .................................... 345/419, 425, 345/433, 473, 121; 707/501, 513

[56] References Cited

U.S. PATENT DOCUMENTS

| 5,276,785 | 1/1994 | Mackinlay et al. | 395/127 |
| 5,287,437 | 2/1994 | Deering | 395/127 |
| 5,359,703 | 10/1994 | Robertson et al. | 395/119 |
| 5,436,638 | 7/1995 | Bolas et al. | 345/156 |
| 5,513,303 | 4/1996 | Robertson et al. | 395/119 |
| 5,566,280 | 10/1996 | Fukui et al. | 395/119 |
| 5,608,850 | 3/1997 | Robertson | 345/427 |
| 5,737,527 | 4/1998 | Shiels et al. | 395/200.09 |
| 5,767,855 | 6/1998 | Bardon et al. | 345/355 |

*Primary Examiner*—Joseph H. Feild
*Assistant Examiner*—Alford W. Kindred
*Attorney, Agent, or Firm*—J. B. Kraft

[57] ABSTRACT

A system, method and computer program are provided for facilitating viewer navigation within a virtual reality three-dimensional workspace containing functional three-dimensional objects. The viewer has the capability of navigating towards such three-dimensional functional objects and interacting with them functionally in specific tasks. Such specific tasks often require a fairly narrow viewpoint to provide close viewer interaction with the object in the specific task. The present invention provides a means for facilitating the viewer's navigation along his desired or planned path after he has completed a specific task relationship with a particular selected object. Means are provided for monitoring the task specific relationship of the viewer with the object and as soon as a determination is made that the viewer has completed his task, the system automatically changes the viewpoint of the viewer from the task specific viewpoint to the optimum browsing or navigation viewpoint with respect to the viewer's current viewpoint so that the viewer can proceed further in his navigation.

11 Claims, 6 Drawing Sheets

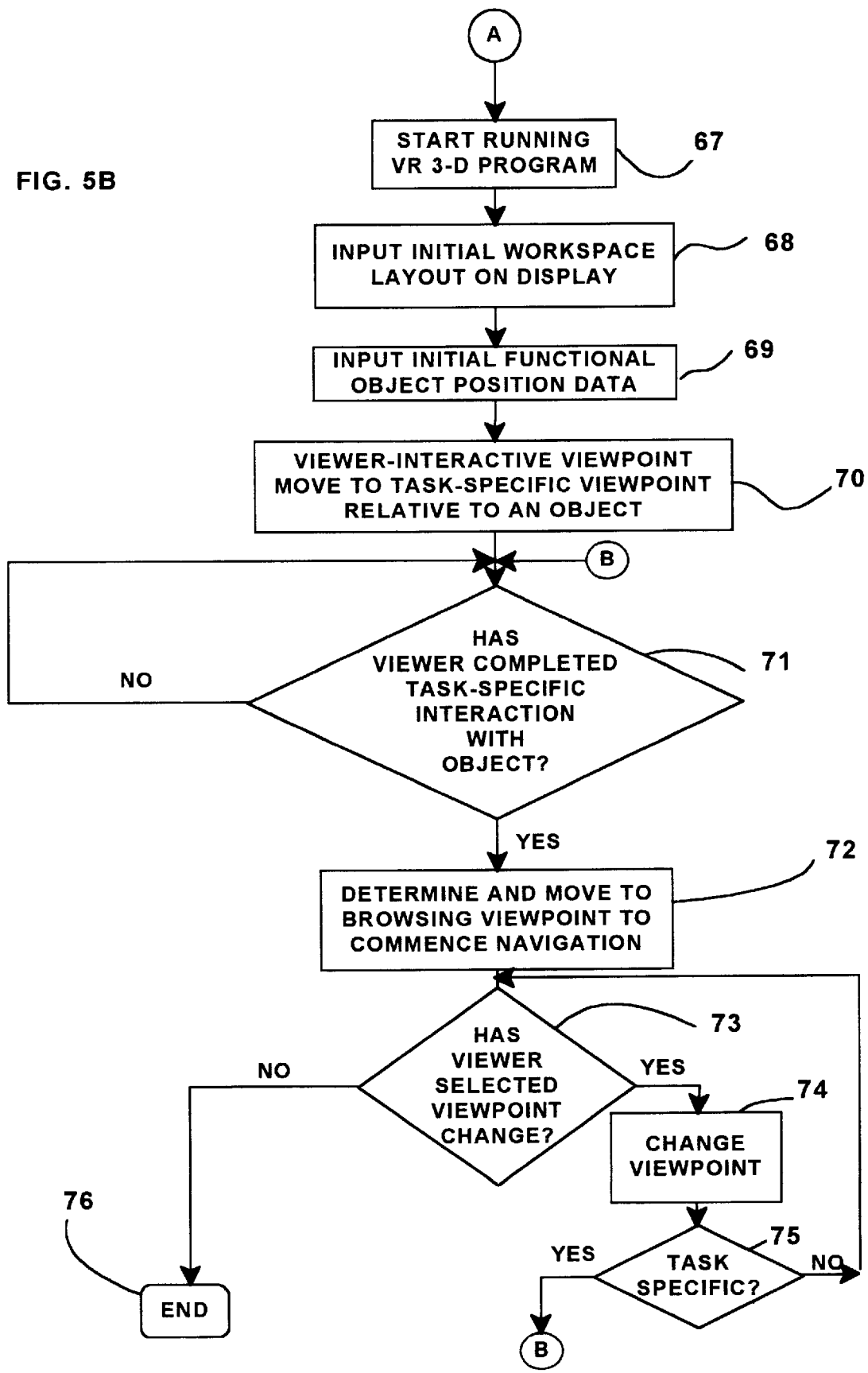

THREE-DIMENSIONAL WORKSPACE INTERACTIVE DISPLAY HAVING BROWSING VIEWPOINTS FOR NAVIGATION AND WORK VIEWPOINTS FOR USER-OBJECT INTERACTIVE NON-NAVIGATIONAL WORK FUNCTIONS WITH AUTOMATIC SWITCHING TO BROWSING VIEWPOINTS UPON COMPLETION OF WORK FUNCTIONS

TECHNICAL FIELD

The present invention relates to user interactive computer supported display technology and particularly to such user interactive systems and methods which are user friendly, i.e. provide even non-computer-literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/813,891 (Attorney Docket No. AT9-96-310), entitled "VIEWER INTERACTIVE OBJECT IN VIRTUAL THREE-DIMENSIONAL WORKSPACE" and Ser. No. 08/813,848 (Attorney Docket No. AT9-96-311), entitled "VIEWER INTERACTIVE OBJECT WITH MULTIPLE SELECTABLE FACE VIEWS IN VIRTUAL THREE-DIMENSIONAL WORKSPACE", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication,* Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the paths he is seeking to travel to in the manner he is seeking to travel to reach objects even when these objects are arranged in 3D space in what appears to be infinite configurations. The invention facilitates the user's navigation in the 3D space so that the user may easily and quickly continue on his navigational path and stick to his navigational objectives.

SUMMARY OF THE INVENTION

It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused and navigate as easily as possible and thus permit the user to concentrate and focus on his planned tasks rather than the navigation itself.

The present invention provides a solution for user navigation needs by providing an optimum or normalized browsing viewpoint associated with the user's position in the three-dimensional workspace after the user has completed a task with respect to a particular object. It should be noted and stressed that this optimum or normalized browsing viewpoint is not the task specific viewpoint presented to the user or viewer when that user or viewer is accessing the three-dimensional object in order to interact with the object. Rather, this normalized or optimum browsing viewpoint is the viewpoint presented to the user when it is determined that the user has completed his interactive task with respect to a particular object and needs to enter into a normalized browsing mode so that he may determine which way he desires to proceed in his navigational path through the three-dimensional workspace containing the functional three-dimensional objects.

In other words, a viewer navigating in three-dimensional space, generally has particular goals and tasks to accomplish for which navigation is but a means for moving his focus from one task to another. In performing such tasks, he is likely to focus his field of view on particular objects, thus diverting their field of view from his navigational path. However, when the viewer's interactive relationship with such objects is determined to be ending or ended, the optimum user-friendly navigation system will try to return the viewer to a field of view which facilitates navigation as easily as possible. Thus, when, according to the present invention, the system senses that the viewer has completed interactive task specific relationships with particular objects, it will act to provide the viewer with a browsing viewpoint associated with the particular three-dimensional object. This browsing viewpoint is of such scope that the viewer may readily select navigational paths which will return him to his planned navigation through the three-dimensional workspace.

The system for determining whether a viewer has completed his interaction with the particular object does so by sensing viewer actions, such as viewer actions indicating that the viewer is beginning to initiate a viewpoint change. For best results we have found that the optimum browsing viewpoint is one in which the viewpoint has a horizontal orientation, and an elevation similar to an average person's height with respect to the objects in the three-dimensional workspace.

BRIEF DESCRIPTION OF THE DRAWINGS

FIGS. 5A and 5B are flowcharts of the process implemented by the present invention (FIG. 5A) and for navigating through the three-dimensional workspace layout (FIG. 5B).

DETAILED DESCRIPTION OF THE PREFERRED EMBODIMENT

Figure 1:
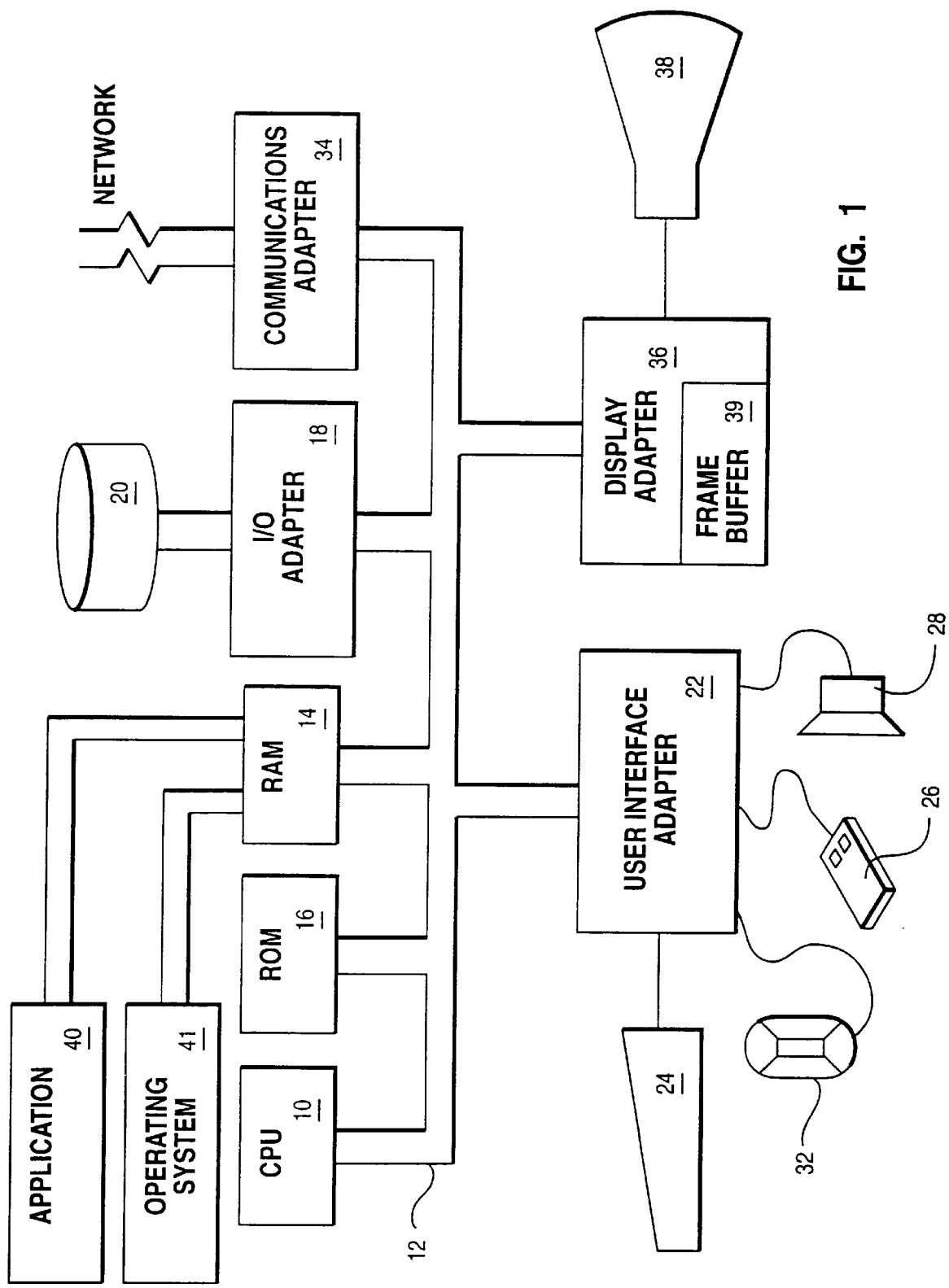
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The three-dimensional workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing. Those skilled in the art will understand how the present invention is implemented using object oriented programming techniques as described above.

With this background of the various expedients which may be used to implement the present invention, the preferred embodiments will now be described.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as operating system 41 in which application 40 operates.

Figure 2:
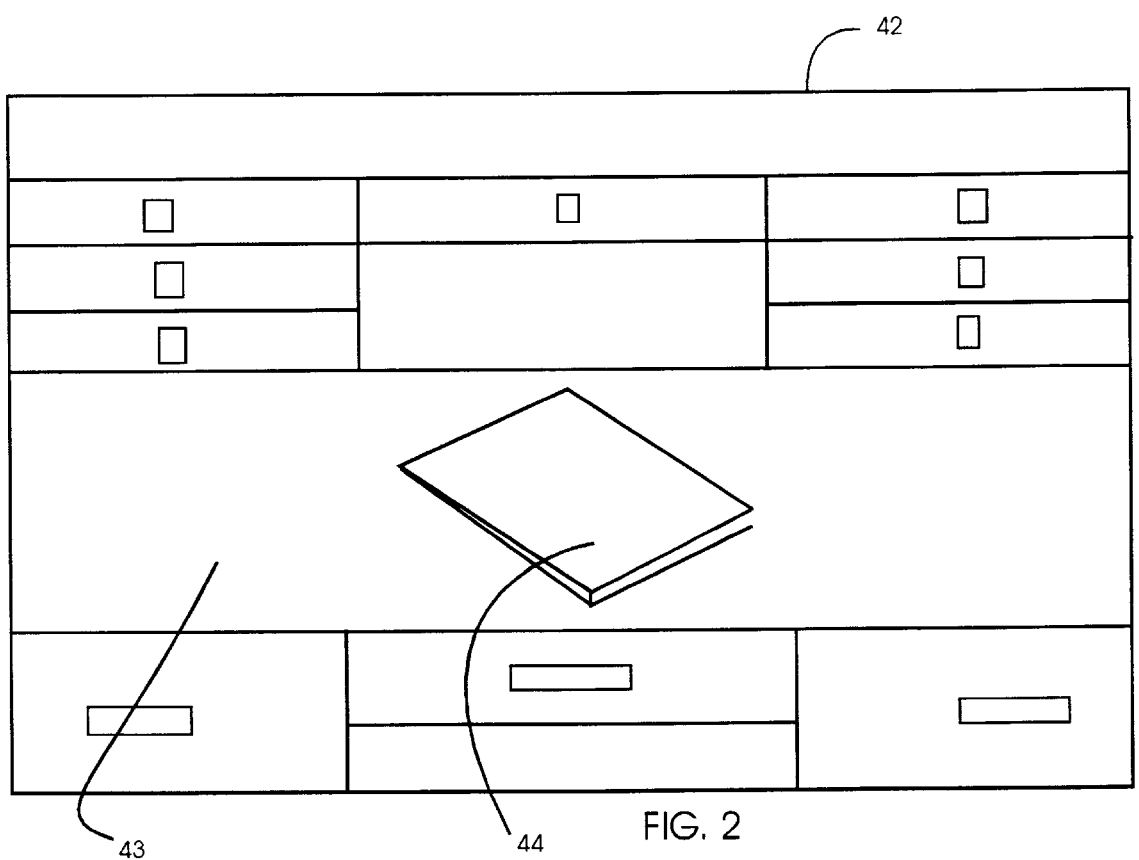
FIG. 2 shows a task specific view of a three-dimensional object in a virtual reality workspace in accordance with the present invention before subsequent navigation.

An embodiment of the present invention will now be described starting with respect to the task specific portion of a virtual reality three-dimensional workspace shown in FIG. 2. The workspace portion 42 is shown as a desk top 43 having book three-dimensional object 44 thereon. Let us consider the image in FIG. 2 as an initial task specific review point of a three-dimensional space presented to the viewer at a display interface such as that which could be shown on display monitor 38 of FIG. 1. In accordance with conventional techniques, the user may control the viewpoint 44 through conventional I/O devices such as mouse 26 in FIG. 1 which operates through user interface 22 to call upon the VRT programs in RAM 14 cooperating with the operating system 41 to create the images in frame buffer 39 of display adapter 36 to control the display on monitor 38. Using conventional virtual three-dimensional workspace navigation techniques, the viewpoint interface of the user shown in FIG. 2 is changeable as the user moves closer or backs away from objects in the workspace or moves to the right or left in the workspace. All this may be controlled by a suitable I/O device such as mouse 26 of FIG. 1.

The viewpoint to workspace portion 42, FIG. 2, is a task specific viewpoint. It is a viewpoint from which a viewer may relate to book 44 on desk 43 for whatever purposes three-dimensional book object may serve or represent interactively. For example, it may be a reference book and the viewer may interactively perform the task of leafing through the pages of the book in order to acquire his desired data, or the book may be an address book and the viewer may go through the book to acquire a desired address, or the book may be a ledger book and accounting entries may be made in the book. In any event, the view of workspace 42 in FIG. 2 is considered to be a task specific viewpoint. As is evident from the viewpoint in FIG. 2, that viewpoint is a very limited one insofar as any broad based virtual reality workspace or landscape may be concerned. Thus, if the viewer is now ready to proceed on the selected path through the three-dimensional workspace, viewpoint 42 would not be a very desirable one from which to browse and decide his navigational direction.

Figure 3:
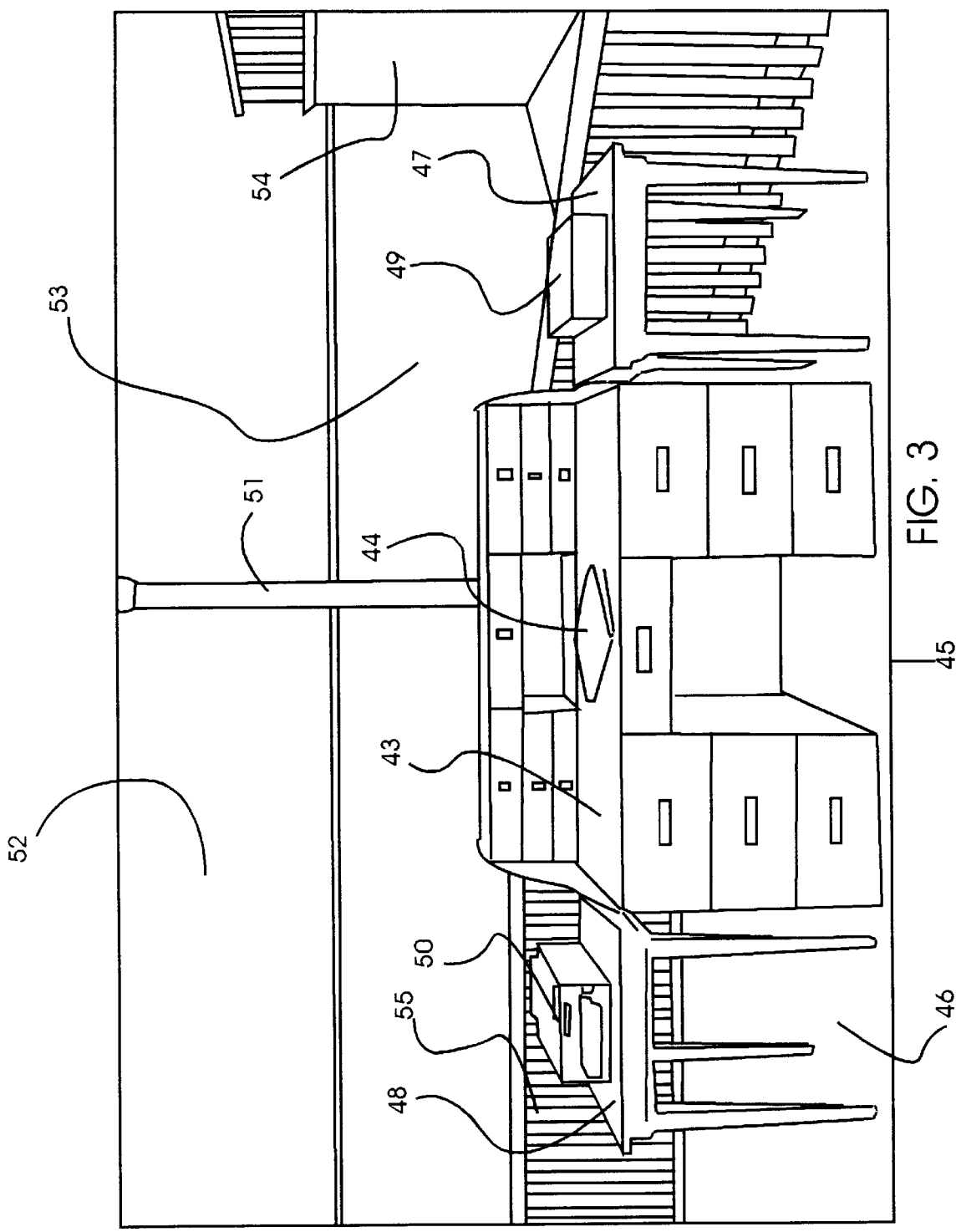
FIG. 3 is a representation of the optimum browsing viewpoint presented to the viewer after the system has determined that the viewer has completed the task specific interaction with the object in FIG. 2.

Thus, in accordance with the present invention, there is provided an optimized browsing viewpoint for navigation which is determined by the position of the task specific viewpoint of FIG. 2 relative to the three-dimensional workspace, which in the present case would be viewpoint 45 of FIG. 3. This is obviously a much better viewpoint from which the viewer may continue by deciding where he wishes to move in his navigation to change viewpoints. Viewpoint 45 of FIG. 3 includes the rest of desk 43, floor 46, tables 47 and 48, respectively containing a telephone answering machine 49 and printer 50, as well as environmental objects such as pole 51, sky 52, outside landscape 53, wall 54, railing 55. All of these serve to orient the viewer who has completed the task with respect to book 44 so that the viewer may now go on, select a path and conduct other business.

As mentioned hereinabove, the transition from the task specific viewpoint of FIG. 2 to the associated optimized browsing viewpoint for navigation of FIG. 3 is automatically triggered by a viewer action which indicates the viewer has completed his task as described with respect to FIG. 2. The signal which triggers this change may be something as simple as the user closing book 44 or it may be some input on the viewer's mouse which indicates that the task described with respect to FIG. 2 has been completed. For our purposes, let us say that when the viewer who has opened book 44 (not shown in open state) now closes it to automatically trigger the viewpoint shown in FIG. 3. Here again, it should be emphasized that the automatically shown viewpoint, i.e. the viewpoint of FIG. 3, is not intended to be a viewpoint which aids the viewer in addressing the object of his task, i.e. book 44, but rather one which helps the viewer to leave his specific task and proceed on his desired navigational path. For best results, we have found that viewpoint for navigation shown in FIG. 3 is preferably at a horizontal orientation at about the virtual eye level of the viewer or user.

Figure 4:
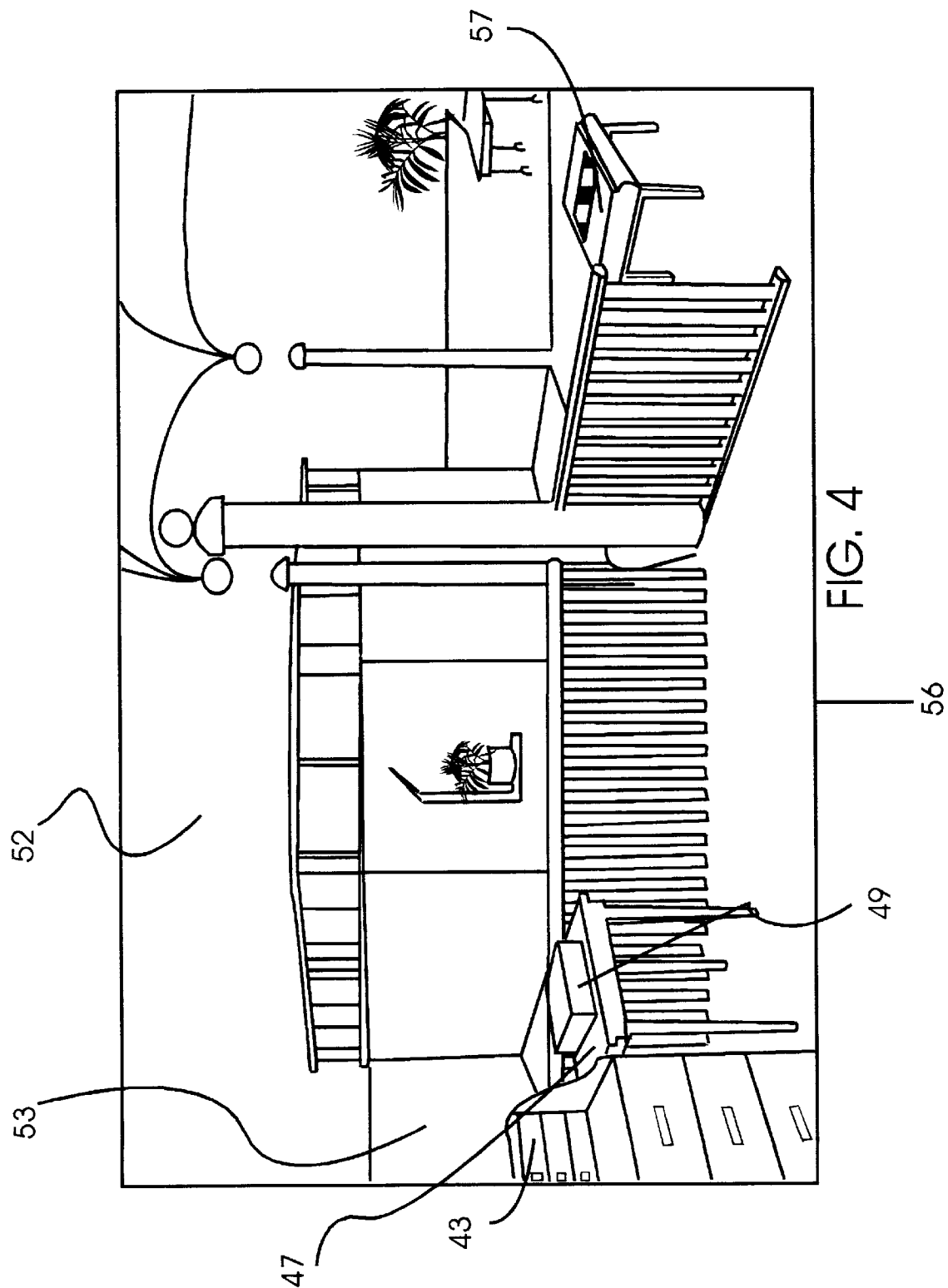
FIG. 4 shows the viewpoint to which the viewer has navigated along from the optimized browsing viewpoint presented to the viewer as shown in FIG. 3.

For purposes of this example, the viewer presented with the viewpoint in FIG. 3 now makes the navigational change where he proceeds to his right and arrives at viewpoint 56 shown in FIG. 4. From this viewpoint the viewer may decide to approach an object in viewpoint 56 of FIG. 4 such as chess board 57 for a specific task, i.e. playing chess, or the viewer may decide to navigate to a different viewpoint.

It should be noted that while the above embodiment of the present invention involves object oriented programming to construct the object entities on the display, the objects with their associated browsing or navigational viewpoints may be implemented in a more traditional language such as "C" or "Basic".

Figure 5A:
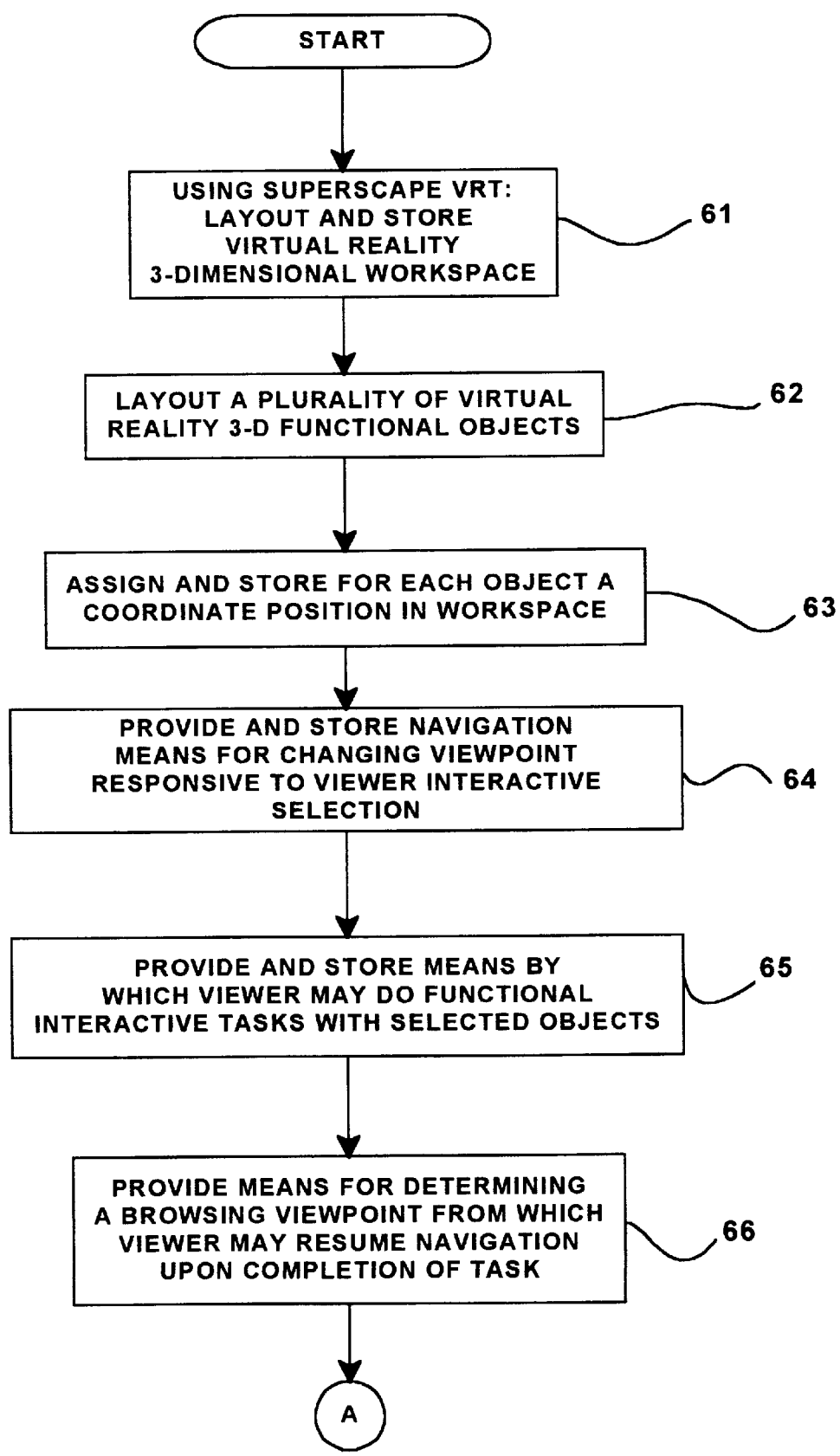

Now with reference to FIGS. 5A and 5B, we will describe a process implemented by the present invention in conjunction with the flowcharts of FIGS. 5A and 5B. First, the steps in FIG. 5A relate to the development of the virtual reality workscapes, the functional objects and their positioning in the workscape in accordance with the present invention using the previously described Superscape VRT programming toolkit. It also includes the development for each task specific viewpoint of an object, parameters for a browsing viewpoint which may be applied as a function of a current viewpoint, the purpose of which is to facilitate navigation. First, step 61, FIG. 5A, the desired virtual reality three-dimensional workspace is created and stored. This would be, for example, the workspace shown broadly in FIGS. 3 and 4, as well as the particular task specific workspace shown in FIG. 2. Next, step 62, the three-dimensional objects are created and laid out in the workspace. These objects have already been described, i.e. desk 43, book 44, tables 47 and 48, telephone answering machine 49, printer 50, etc. Next, step 63, each of these objects is assigned a coordinate position in the workspace as shown in FIGS. 3 and 4 and this position is stored.

Next, step 64, there is provided and stored navigation means for changing the viewpoint of the viewer at the display interface responsive to the viewer interactively selecting one of the objects and the particular path to proceed to the object. These navigation means can be any conventional navigation means either for proceeding along a particular path as in the transition from FIG. 3 to FIG. 4, or in approaching an object for a task specific function as described with respect to FIG. 2. Next, step 65, programming means are provided by which a viewer may accomplish and proceed with functional interactive tasks with respect to selected objects, e.g. as previously described the task specific function of accessing book 44 in FIG. 2 and turning pages to acquire desired information. Next, step 66, there is provided and stored for each object such as book 44 which is capable of being interactively addressed by the viewer for task specific functions, a stored browsing viewpoint from which a viewer may return to his planned navigational path after he has completed the functional task with respect to the object. This will be described in greater detail hereinafter with respect to FIG. 5B.

The process now proceeds to point A in FIG. 5B whereat the created virtual reality workspace program is run, step 67. As previously mentioned, the program is run on a system such as that shown in FIG. 1 with particular application programs herein being loaded on RAM 14, connected to display buffer 36 which forms the stored images via frame buffer 39 controlling the display monitor 38. The program initially sets up the workspace layout on the display, step 68. It also inputs and sets up the objects in their positions in the three-dimensional workspace, step 69. With this set up, it is possible to do a variety of navigation on the part of the viewer by changing viewpoints or addressing specific three-dimensional objects for various interactive functional relationships.

However, for the purpose of the present invention, let us assume that navigation has taken place and the viewer is now at the viewpoint shown in FIG. 2, which is an interactive viewpoint by which the viewer may functionally access book 44 for, let us say, research purposes, step 70, FIG. 5B. At this stage and while the viewer is working at this viewpoint in task specific interaction with the book object, the viewer's actions are being constantly monitored, decision block 71, in order to determine whether the viewer has completed his task specific interaction with the book 44 and desires a browsing viewpoint. If the decision from decision block 71 is negative, i.e. the task has not been completed, the system returns to decision block 71 and monitoring continues. On the other hand, if the system senses that the viewer is completing or has completed the task, and this may be done by a variety of sensing determinants, such as the previously described viewer action of closing book 44. Then the system, step 72, automatically displays the optimum browsing viewpoint for the viewer continuing with his navigation. In this specific case, it would be viewpoint 45 shown in FIG. 3. This viewpoint is determined by the position of the task specific viewpoint of FIG. 2 in the three-dimensional workspace. The viewpoint is a combination of tilt or orientation which preferably "0" or horizontal elevation, preferably that of a standing person and distance from the object with which the specific task has been completed. This is a distance sufficient so that the object does not interfere with the navigational or browsing viewpoint.

From this viewpoint, the viewer can now readily proceed with further navigation. Thus, decision block 73, a determination is made as to whether the viewer has selected a viewpoint change. Where, in the present case, the viewer has selected a viewpoint change, i.e. navigation from viewpoint 45 in FIG. 3 to viewpoint 56 in FIG. 4, then, step 74, the viewpoint is changed to that of viewpoint 56 in FIG. 4. Next, decision block 75, a determination is made as to whether the viewpoint change is task specific with respect to a particular object interactive function. If the change is task specific, the system then loops back to decision block 71 where the task, with respect to particular objects, is monitored in order to determine when the viewer has completed the functional task. On the other hand, if the change of viewpoint is not task specific, then the system is returned to decision block 73 where a further determination is made as to whether the viewer has navigated further and selected a different viewpoint. Where, in decision block 73 the viewer has selected no further viewpoint change, the present routine is ended, step 76.

Although certain preferred embodiments have been shown and described, it will be understood that many changes and modifications may be made therein without departing from the scope and intent of the appended claims.

We claim:

1. In a data processor controlled display system for displaying a virtual three-dimensional workspace having a plurality of virtual viewer interactive three-dimensional objects therein, viewer interactive means for navigating within said workspace comprising:

means for providing to viewers viewpoints into said workspace, viewer interactive means for changing from one viewpoint to another, means for providing to viewers, work viewpoints from which viewers may interact with a three-dimensional object, means for providing to viewers, browsing viewpoints of such scope that viewers may readily select navigation paths to other viewpoints, means for determining whether viewers have completed said interaction at work viewpoints, and means responsive to said determining means for automatically providing to said viewer a selected browsing viewpoint upon the completion of said work viewpoint interaction.

2. The display system of claim 1 wherein said means for determining whether a viewer has completed said non-navigational work functions at a work viewpoint senses viewer actions to determine changes.

3. The display system of claim 2 wherein said changes include initiating viewpoint changes.

4. The display system of claim 3 wherein said selected browsing viewpoint has a horizontal orientation.

5. In a computer implemented method for displaying a virtual three-dimensional workspace having a plurality of virtual viewer interactive three-dimensional objects therein, a viewer interactive method for navigating within said workspace comprising:

providing to viewers, viewpoints into said workspace, permitting viewers to interactively change from one viewpoint to another, providing to viewers, work viewpoints from which viewers may interact with three-dimensional objects, providing to viewers, browsing viewpoints of such scope that viewers may readily select navigation paths to other viewpoints, determining whether viewers have completed said interaction at a work viewpoint, and automatically providing to said viewers, a selected browsing viewpoint responsive to a determination that said interaction at said work viewpoint has been completed.

6. The method of claim 5 wherein said determination as to whether a viewer has completed said non-navigational work functions at a work view senses viewer actions to determine changes.

7. The method of claim 6 wherein said changes include initiating viewpoint changes.

8. The method of claim 5 wherein said browsing viewpoints have a horizontal orientation.

9. A computer program having data structures included on a computer readable medium which causes the display on a data processor supported display of virtual three-dimensional workspace having a plurality of virtual viewer interactive three-dimensional objects therein which includes, viewer interactive means for navigating within said workspace comprising, means for providing to viewers viewpoints into said workspace, viewer interactive means for changing from one viewpoint to another, means for providing to viewers work viewpoints from which viewers may interact with a three-dimensional object, means for providing to viewers browsing viewpoints of such scope that viewers may readily select navigation paths to other viewpoints, means for determining whether viewers have completed said interaction at work viewpoints, and means responsive to said determining means for automatically providing to said viewer a selected browsing viewpoint upon the completion of said work viewpoint interaction.

10. The computer program according to claim 9 wherein said means for determining whether a viewer has completed said non-navigational work functions at a work viewpoint senses viewer actions to determine changes.

11. The computer program according to claim 9 wherein said selected browsing viewpoint has a horizontal orientation.

* * * * *

UNITED STATES PATENT AND TRADEMARK OFFICE
CERTIFICATE OF CORRECTION

PATENT NO.      : 5,900,879                                               Page 1 of 1
DATED           : May 4, 1999
INVENTOR(S)     : Berry, et al.

It is certified that error appears in the above-identified patent and that said Letters Patent is hereby corrected as shown below:

Claim 1, column 10,
Line 42, after "object," insert -- to perform non-navigational work functions --;

Claim 5, column 11,
Line 2, after "objects," insert -- to perform non-navigational work functions --;

Claim 9, column 12,
Line 8, after "object," insert -- to perform non-navigational work functions --;

Signed and Sealed this

Eighteenth Day of September, 2001

*Attest:*

*Nicholas P. Godici*

NICHOLAS P. GODICI
*Attesting Officer*     *Acting Director of the United States Patent and Trademark Office*